(12) United States Patent
Hwang et al.

(10) Patent No.: US 7,056,989 B2
(45) Date of Patent: *Jun. 6, 2006

(54) POLYALKYLAROMATICSILSESQUIOXANE AND PREPARATION METHOD THEREOF

(75) Inventors: Seung Sang Hwang, Seoul (KR); Soon Man Hong, Seoul (KR); Eung Chan Lee, Incheon (KR); Seung Pyo Hong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/386,936

(22) Filed: Mar. 13, 2003

(65) Prior Publication Data

US 2003/0232943 A1 Dec. 18, 2003

Related U.S. Application Data

(63) Continuation-in-part of application No. 09/845,246, filed on May 1, 2001, now Pat. No. 6,599,995.

(51) Int. Cl.
*C08G 77/04* (2006.01)
*C08G 77/06* (2006.01)

(52) U.S. Cl. .............. 525/474; 528/14; 528/21; 528/33; 528/43

(58) Field of Classification Search .............. 528/14, 528/21, 33, 43; 525/474
See application file for complete search history.

(56) References Cited

U.S. PATENT DOCUMENTS

| | | | | |
|---|---|---|---|---|
| 4,722,881 A * | 2/1988 | Ueno et al. | ............... | 430/192 |
| 4,962,156 A * | 10/1990 | Shinjo et al. | ............... | 525/100 |
| 5,039,771 A * | 8/1991 | Morimoto et al. | ............ | 528/14 |
| 5,079,299 A * | 1/1992 | Hisamoto et al. | ............ | 525/100 |
| 5,179,185 A * | 1/1993 | Yamamoto et al. | ............ | 528/32 |
| 5,236,984 A * | 8/1993 | Yamamoto et al. | ......... | 524/233 |
| 6,340,735 B1 * | 1/2002 | Yagihashi | ................ | 528/37 |
| 6,599,995 B1 * | 7/2003 | Hwang et al. | ............... | 525/474 |
| 6,787,625 B1 * | 9/2004 | Lee | ............................. | 528/33 |

* cited by examiner

*Primary Examiner*—Jeffrey B. Robertson
(74) *Attorney, Agent, or Firm*—Lowe Hauptman & Berner LLP (57) ABSTRACT

Highly regular and well-defined structured polyorganosilsesquioxane polymer with superior heat resistance, combustion resistance and flexibility, wherein same or different kinds of substituents are bonded alternately, and the preparation method thereof. The polyorganosilsesquioxane prepared according to the present invention has a small molecular weight distribution and a high molecular weight, and is soluble in organic solvents because a three-dimensional network structure is not formed during the preparative condensation polymerization. Polyalkylaromaticsilsesquioxane obtained from the preparing method of the present invention is a useful heat-resistant material. It can be used as a heat-resistant coating agent, a protective coating agent of optical fiber, a coating material for resistor, heat-resistant paint, an adhesive and a releasing agent for precise molding. Also, it can be used for the semiconductor protective layer, interlayer dielectrics for semiconductor integration (e.g. LSI), new heat-resistant photoresist, and functional photonics materials.

24 Claims, 7 Drawing Sheets

POLYALKYLAROMATICSILSESQUIOXANE AND PREPARATION METHOD THEREOF

CROSS-REFERENCE TO RELATED APPLICATION

This is a continuation-in-part of application Ser. No. 09/845,246, filed on May 1, 2001, now U.S. Pat. No. 6,599,995.

FIELD OF THE INVENTION

The present invention relates to solid polyorganosilsesquioxane polymers with superior heat resistance, combustion resistance and flexibility, expressed by the following formula (1) having a highly regular ladder structure, wherein the same or different kinds of substituents are bonded alternately, and a preparation method thereof, (1)

wherein $R_1$ and $R_2$ represent, independently, a hydrogen atom, an alkyl group having 1 to 30 carbon atoms such as methyl, ethyl and propyl, substituted or non-substituted aromatic groups having 1 to 30 carbon atoms such as phenyl and halogenated phenyl, substituted or non-substituted allyl groups having 1 to 30 carbon atoms, substituted or non-substituted cyclo-compounds having 1 to 30 carbon atoms, substituted or non-substituted acyl groups having 1 to 30 carbon atoms, vinyl, amine or acetate; and n is an integer equal to or higher than 5.

DESCRIPTION OF THE PRIOR ART

Polyorganosilsesquioxanes have been conventionally prepared by condensation polymerization of oligomers by heating, which were obtained by hydrolyzingtrichlorosilane or triethoxysilane in the presence of an alkaline catalyst in highly viscous solvents such as NMP, DMSO or MIBK [Brown et al., *J. Am. Chem. Soc.*, 82, 6194 (1960)]. By this hydrolysis method, oligomers ($M_{n=}1000-3000$, $M_w/M_n>2$) other than a precursor (silanetriol) tend to be formed because condensation occurs concurrently with the hydrolysis. Further, polymers obtained from the oligomers in the presence of an alkaline catalyst had the following problems:

a. They usually have a large molecular weight distribution and a low molecular weight ($M_n$ below 20,000–30,000); and
b. They are insoluble in organic solvents because the 3-dimensional network structure that is formed during the condensation polymerization has defects and randomness because of the oligomer structure.

Also, it is almost impossible to control the molecular weight of polymers via this polymerization method.

There is still another method for preparing a silicon ladder polymer using phenylsilanetriol [L. J. Tyler et al., *J. Am. Chem. Soc.*, 77, 770 (1955), T. Takiguchi et al., *J. Am. Chem. Soc.*, 81, 2359 (1959), E. C. Lee et al., *Polymer Journal*, 29(8), 678 (1997)], which enables the preparation of highly regular polymers with 1,000–1,000,000 of average number molecular weights ($M_n$) and a ratio lower than 2 with respect to the molecular weight distribution ($M_w/M_n$). However, this other method requires a very complicated process to obtain silanetriol of high purity and, also, the treatment of phenylsilanetriol is very difficult. Further, the yield is very low (lower than 10–20%), and thus this process is not economical.

SUMMARY OF THE INVENTION

In order to solve these problems, the present invention aims at designing a molecular model, wherein R,R'—$SiO_{3/2}$ can be regularly introduced into a main chain of a polymer in a simple way, and a method of condensation. Another embodiment of this invention is in the substantially regular ladder polyorganosilsesquioxane polymer made by the instant method.

DETAILED DESCRIPTION OF THE INVENTION

The present invention relates to substantially perfect ladder-structured polyalkylaromaticsilsesquioxanes with superior heat resistance, combustion resistance and flexibility, expressed by the following formula (1), (1)

wherein $R_1$ and $R_2$ represent, independently, a hydrogen atom, an alkyl group having 1 to 30 carbon atoms, a substituted or non-substituted aromatic compound having 1 to 30 carbon atoms, a substituted or non-substituted allyl group having 1 to 30 carbon atoms, a substituted or non-substituted cyclo-compound having 1 to 30 carbon atoms, a substituted or non-substituted acyl group having 1 to 30 carbon atoms, vinyl, amine or acetate; and n is an integer equal to or higher than 5.

The repeating unit, i.e. "n", of the substantially perfect ladder-structured polyalkylaromaticsilsesquioxane herein is an integer, preferably in the range of from 5 to 5,000.

The nonlimiting examples of the above alkyl group having 1 to 30 carbon atoms are a methyl group, an ethyl group and a propyl group; and the nonlimiting examples of the substituted or non-substituted aromatic compound having 1 to 30 carbon atoms are a phenyl group and a halogenated phenyl group. Moreover, the alternately bonded substituents, $R_1$ and $R_2$, may be same or different.

The present invention also relates to a method of preparing a substantially perfect ladder-structured polyalkylaromaticsilsesquioxane expressed by the formula (1) from 1,3-organodisiloxane expressed by the following formula (2), (2)

wherein $R_1$, $R_2$ and n are same as defined above; X represents a hydrogen atom, OH, $NH_2$ or carboxylate; and R represents a hydrogen atom, an alkyl group, an acyl group or an alkali metal.

The preparation method herein comprises a step of carrying out a condensation polymerization of same or different compounds selected from the 1,3-organodisiloxane expressed by formula (2), preferably in a solution of the 1,3-organodisiloxane. The concentration of the solution preferably is in the range of about 30 to 80 wt %.

In the present invention, 1,3-organodisiloxane is soluble in general organic solvents and the prepared polymer is also soluble in general organic solvents, for examples, aromatic hydrocarbons such as toluene, xylene, benzene and chlorobenzene; halogenated hydrocarbons such as methlyene chloride, chloroform, dichloroethylene, trichloroethylene and trichloroethane; ethers such as THF, 1,4-dioxane, diethyl ether and dibutyl ether; ketones such as acetone, methyl ethyl ketone and methyl ether ketone; esters such as butyl acetate, ethyl acetate, a mixture of ethyl acetate and methyl acetate; and dimethylformamide.

If the concentration is lower than 30 wt. %, the condensation reaction becomes slow or insufficient. If the concentration is higher than 80 wt. % it will result in gel formation.

The above condensation polymerization can be performed with or without a catalyst, such as an alkali metal hydroxide, an amine, a quaternary ammonium salt or a fluoride compound. The nonlimiting examples of an alkali metal hydroxide catalyst are NaOH, KOH and CsOH; and the nonlimiting examples of an amine are triethylamine, diethylene triamine, N-bytylamine, p-dimethylaminoethanol and triethanolamine. If the condensation polymerization is performed in the presence of the catalyst, it is preferable that concentration of the catalyst be in the range of about 0.01 to 20 wt % with reference to the weight of the 1,3-organodisiloxane.

Other catalysts may be also selected to facilitate the condensation reaction of 1,3-organodisiloxane. In the present invention, the condensation reaction can be carried out by heating 1,3-organodisiloxane solution. A preferred reaction temperature is 50° C.–350° C., more preferably 100–150°.

It is preferable that the reaction time is about 6–50 hrs when acatalyst is used. If no catalyst is used, the reaction will have to be carried out for a relatively long time at a high temperature.

If the 1,3-organodisiloxane is above 90% in purity, a sufficiently high-molecular-weight polymer can be obtained by this method.

The present invention also relates to a method of increasing the degree of the polyalkylaromaticsilsesquioxane herein, expressed by the formula (1), by way of:

(a) obtaining polyalkylaromaticsilsesquioxane expressed by formula (1) by carrying out condensation polymerization in a solution of same or different compounds selected from the 1,3-organodisiloxanes expressed by the formula (2); and (b) further carrying out condensation polymerization by using the polyalkylaromaticsilsesquioxane obtained in step (a) in a solid state, preferably at a temperature ranging of about 150 to 350° C.

EXAMPLES

Hereunder is given a detailed description of a method of preparation of the polymer products of this invention. However, this description should not be construed as limiting the scope of the present invention.

Preparation Example 1

Figure 1:
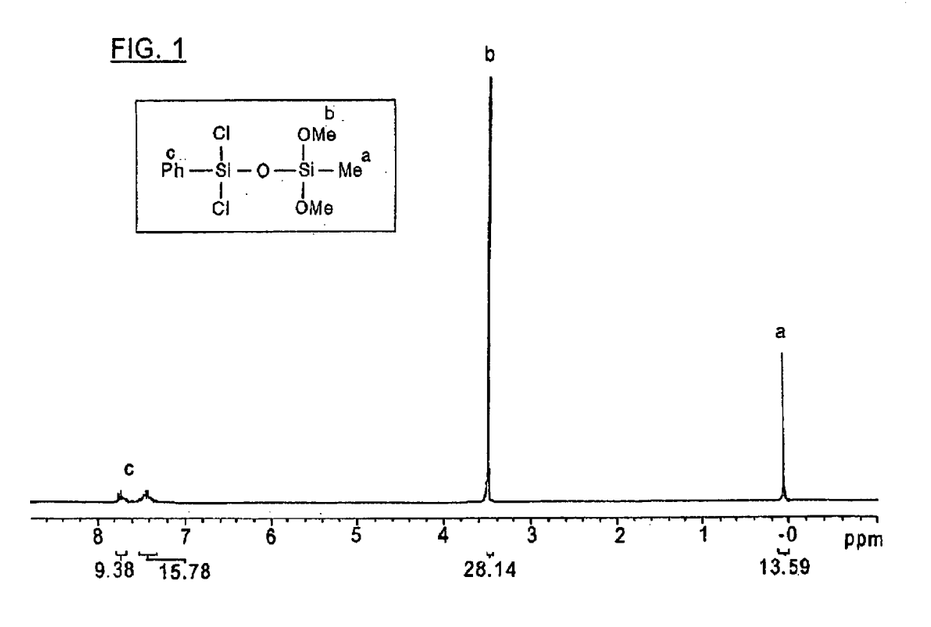
FIG. 1 is an $^1H$ NMR spectrum of 1,1,1-dichlorophenyl-3,3,3-dimethoxymethyldisiloxane

A 50 mL round-bottomed flask, connected to a dropping funnel and equipped with a magnetic stirrer, was flame-dried under nitrogen flow. After placing 20 mL of toluene into the flask equipped with a reflux condenser, it was heated to 110° C. The reaction was carried out by adding 7.8 g of 1,1,1-dichlorophenyl-3,3,3-dimethoxymethyl disiloxane [$PhCl_2Si$—O—Si—$Me(OMe)_2$] (cf. FIG. 1) at a rate of 1 drop/min under nitrogen flow. After the addition was completed, the reaction temperature was raised to 120° C., and the reaction was resumed for 24 hours.

After adding 10 mL of water distilled three times, and stirring the reaction mixture for 3 hours, the reaction was terminated. After dropping the reaction mixture solution into excess methanol, stirring for 1–2 hours and filtering the precipitate, a product was obtained that was a white powder (yield: 92%, 7.18 g). Analysis was performed after drying the product under the vacuum for 10 hours at 110° C.

The average number molecular weight ($M_n$) and the molecular weight distribution ($M_w/M_n$) of the prepared polymer was 12,000 and 1.38, respectively.

The structure of the prepared polymer was analyzed with $^1H$ NMR and IR.

Figure 2:
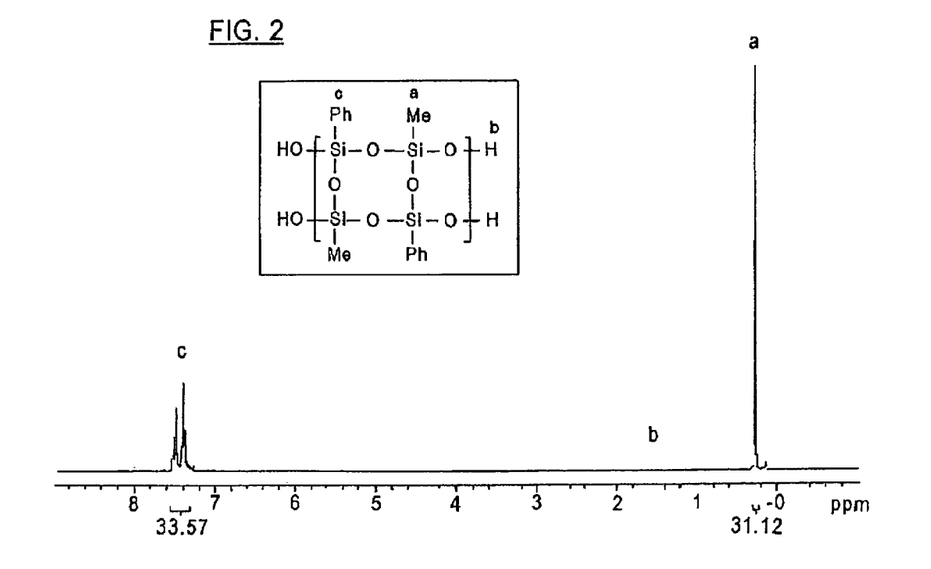
FIG. 2 is an $^1H$ NMR spectrum of poly(methylphenylsilsesquioxane)

$^1H$ NMR analysis showed the Si—$CH_3$ chemical shift at 0.15 ppm, Si—OH chemical shift at 1.5 ppm and Si—Ph chemical shift at 7.1–7.6 ppm. In particular, the integral ratio of $CH_3$/Ph was 31.12:53.57, which is close to the theoretical value of 3:5 (cf. FIG. 2).

Figure 3:
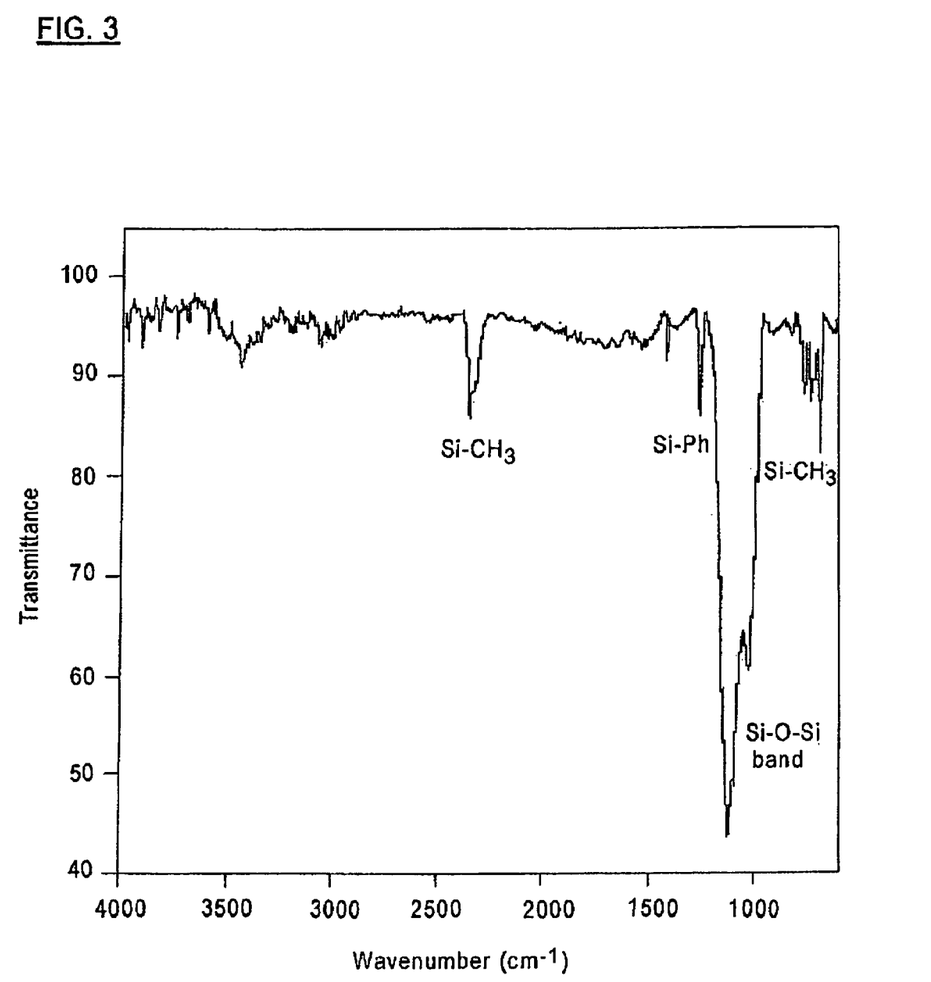
FIG. 3 is an IR spectrum of poly(methylphenylsilsesquioxane)

Also, IR analysis showed the asymmetric stretching vibration of the siloxane bond (Si—O—Si) (theoretical values: 1040 & 1140 $cm^{-1}$), characteristic of the silicone ladder polymer, as a double peak at 1035.5 and 1137.9 $cm^{-1}$ (cf. FIG. 3).

With these, the structure of the polymer of the present invention was identified as corresponding to formula (1).

Preparation Example 2

The experiment apparatus was identical to that used in Preparation Example 1.

Figure 4:
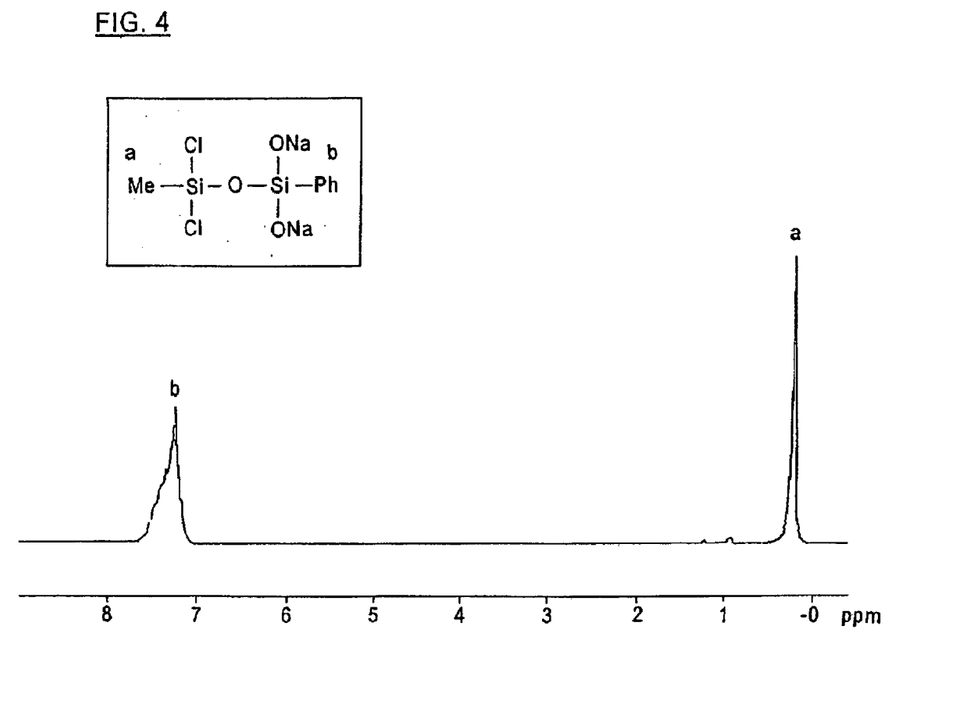
FIG. 4 is an $^1H$ NMR spectrum of 1,1,1-dichloromethyl-3,3,3-phenyldisodiumlatedisiloxane

After placing 10 mL of DMSO in a 50 mL round-bottomed flask equipped with a reflux condenser, it was heated to 110° C. After transferring 5 g of separately prepared 1,1,1-dichloromethyl-3,3,3-phenyldisodiumelate disiloxane [MeCl$_2$Si—O—SiPh(ONa)$_2$] (cf. FIG. 4) dissolved in DMSO to a dropping funnel under nitrogen flow, the reaction was caused to proceed by slowly dropping the prepared solution (1 drop per 3 min) while stirring vigorously. After dropping was completed, the reaction temperature was raised to 120° C., and the reaction was resumed for 24 hr.

After adding 10 mL of water that had been distilled three times, bubbling with dry CO$_2$ gas and stirring the reaction mixture for 3 hr, the reaction was terminated. After dropping the reaction mixture solution into excess methanol, stirring for about 2 hr and filtering the precipitate, the product was obtained as a white powder (yield: 90.8%, 4.54 g). Analysis was performed after drying the product in vacuum for 10 hr at 110° C. of example 2.

The average number molecular weight ($M_n$) and the molecular weight distribution ($M_w/M_n$) of the prepared polymer were 48,000 and 1.51, respectively. The molecular weight distribution was lower than 2.

The structure of the polymer prepared according to Example 2, was identical to that prepared in Preparation Example 1.

Preparation Example 3

Figure 5:
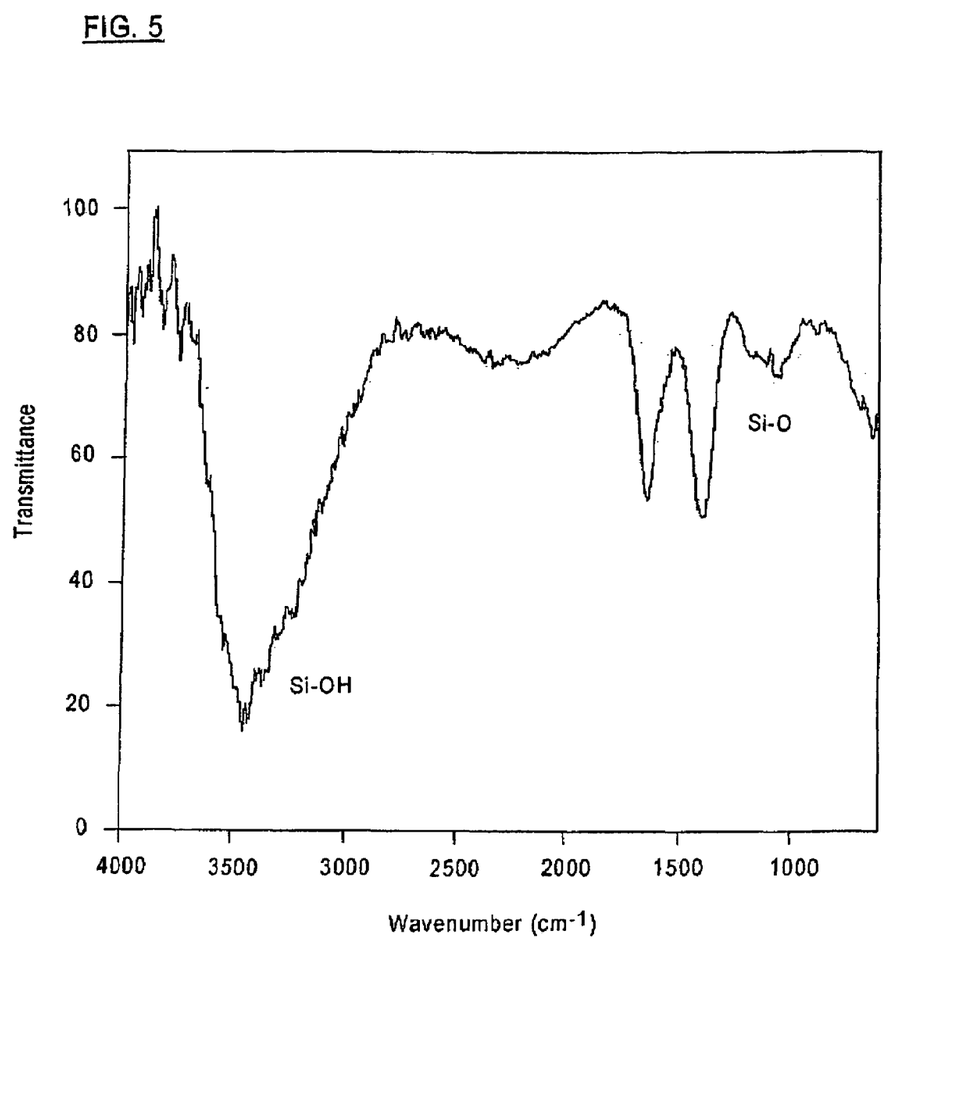
FIG. 5 is an IR spectrum of 1,1,1-dimethoxymethyl-3,3,3-dihydroxy-phenyldisiloxane

A 100 ml 1-neck, round-bottomed flask and a 500 mL 3-neck round-bottomed flask connected to a dropping funnel and equipped with a magnetic stirrer were flame-dried under dry nitrogen flow. After dissolving 10 g of 1,1,1-dichlorophenyl-3,3,3-dimethoxymethyldisiloxane[PhCl$_2$Si—O—Si—Me(OMe)$_2$] in 80 mL of toluene in a separate 1100 mL flask, the reaction mixture was stirred until its temperature reached 3° C. and then it was transferred to a dropping funnel. After placing 310 mL of distilled water and ice in the 500 mL 3-neck round bottom flask, the hydrolysis was performed by dropping the mixture solution in slowly (1 drop per 1 sec) while stirring vigorously. After stirring for another 20–30 min after the dropping was finished, the hydrolysis was completed. The reaction solution was separated into a water layer and, respectively, a toluene layer in a separation funnel. 70 wt. % of cooled sodium bicarbonate solution was dropped through a dropping funnel in order to neutralize hydrochloric acid produced in the water layer to pH 7. After precipitating the hydrolysate in the water layer by the thawing method and filtering the filtrate, 9.4 g of the hydrolysate [Ph(OH)$_2$Si—O—SiMe(OMe)$_2$] (cf. FIG. 5) (yield: 94 wt %) was obtained.

After dissolving 9.4 g of the hydrolysate in 10 mL of toluene in a 50 mL round bottom flask equipped with the Dean-Stark tube, the ladder polymerization was performed for 16 hrs at 120° C. in the presence of 0.94 mg (0.01 wt %) of KOH catalyst. After dropping the reaction solution into excess methanol, stirring for about 30 min and filtering the precipitate, the product was obtained as a white powder (yield: 95.7%, 9 g). Analysis was performed after drying the product for 10 hr at 110° C. under vacuum.

The average number molecular weight ($M_n$) and the molecular weight distribution ($M_w/M_n$) of the prepared polymer were 78,000 and 1.32, respectively.

The structure of the prepared polymer was identical as in Preparation Example 1.

Preparation Example 4

A 100 ml 1-neck round-bottomed flask and a 500 mL 3-neck round-bottomed flask connected to a dropping funnel and equipped with a magnetic stirrer were flame-dried under a dry nitrogen flow. After dissolving 10 g of 1,1,1-dichlorophenyl-3,3,3-dimethoxyphenyldisiloxane[PhCl$_2$Si—O—Si—Ph(OMe)$_2$] in 80 mL of toluene in a separate 100 mL flask, the reaction mixture was stirred until the temperature reached 3° C. and then transferred to a dropping funnel. After placing 310 mL of distilled water and ice in a 500 mL 3-neck round bottom flask, the hydrolysis was performed by dropping the mixture solution slowly (1 drop per 1 sec) while stirring vigorously. After stirring another 20–30 min after the dropping was finished, the hydrolysis was completed. The reaction solution was separated into a water layer and a toluene layer in a separation funnel. 70 wt. % of cooled sodium bicarbonate solution was dropped through a dropping funnel in order to neutralize hydrochloric acid produced in the water layer to pH 7. After precipitating the hydrolysate in the water layer by the thawing method and filtering the filtrate, 9.5 g of the hydrolysate [Ph(OH)$_2$Si—O—SiPh(OH)$_2$] (yield: 95 wt %) was obtained.

After dissolving 9.5 g of the hydrolysate in 10 mL of toluene in a 50 mL round bottom flask equipped with the Dean-Stark tube, the condensation polymerization was performed for 16 hr at 120° C. in the presence of 0.95 mg (0.01 wt %) of KOH catalyst. After dropping the reaction solution into excess methanol, stirring for about 30 min and filtering the precipitate, the product was obtained as a white powder (yield: 95.8%, 9.1 g). Analysis was performed after drying the product for 10 hr at 110° C. under vacuum.

The average number molecular weight ($M_n$), the number average degree of polymerization, and the molecular weight distribution ($M_w/M_n$) of the prepared polymer were 120,000; 232; and 1.89, respectively.

The structure of the prepared polymer was analyzed with $^1$H NMR and IR.

Figure 6:
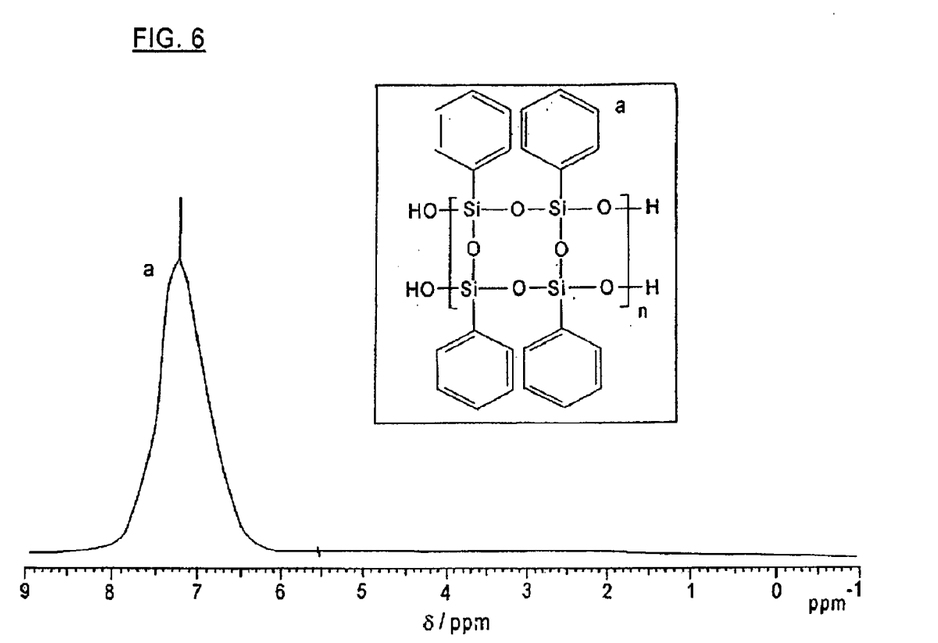
FIG. 6 is an $^1H$ NMR spectrum of polyphenylsilsesquioxane
Figure 7:
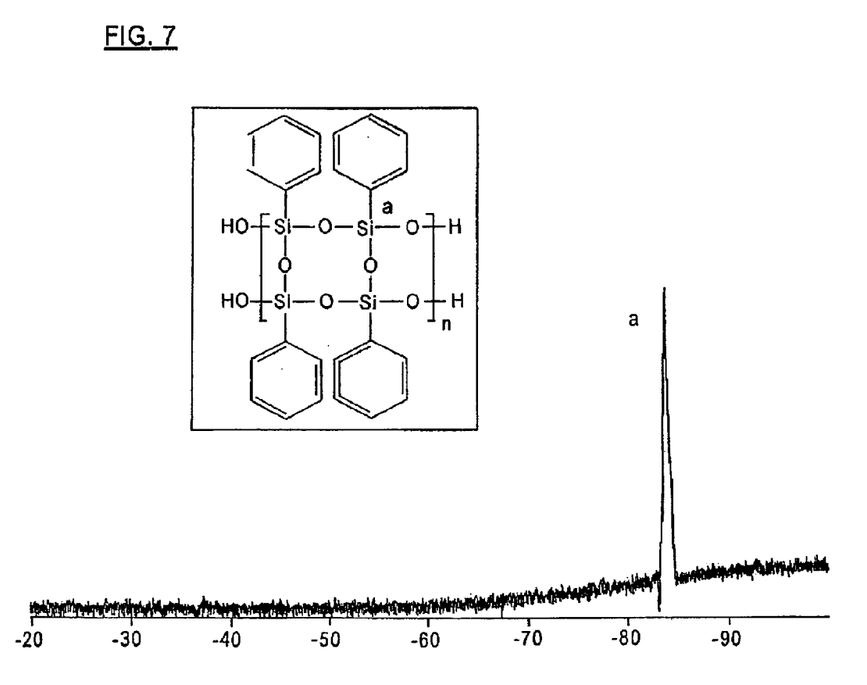
FIG. 7 is an $^{29}Si$ NMR Spectrum spectrum of polyphenylsilsesquioxane

$^1$H NMR analysis showed the Si—Ph chemical shift at 6.4–7.7 ppm and Si—OH chemical shift, which might appear at 1.5 ppm, was not observed due to the low concentration of end groups (cf. FIG. 6). $^{29}$Si NMR analysis showed the chemical shift of the T$_3$ structure at −83 ppm, which confirmed that synthesized polyphenylsilsesquioxane had a perfect ladder structure (cf. FIG. 7).

Also, IR analysis showed the asymmetric stretching vibration of the siloxane bond (Si—O—Si) (theoretical values: 1040 & 1140 cm$^{-1}$), which are characteristic of the silicone ladder polymer, as a double peak at 1035.5 and 1137.9 cm$^{-1}$.

With these data, the structure of the polymer of the present invention was identified as the formula (1).

Preparation Example 5

A 00 ml 2-neck round-bottomed flask equipped with a magnetic stirrer was flame-dried under dry nitrogen flow. After adding 5 g of polyphenylsilsesquioxane prepared in example 4 to flask, the reaction mixture was stirred until the temperature reached 250° C. under dry nitrogen flow. The solid state polymerization was performed for 12 hours at 250° C. under dry nitrogen flow. After dissolving the polymer in 50 ml toluene, the polymer solution was reprecipitated from excess methanol. After filtering the precipitate, the product was obtained as a white powder (yield: 98%, 4.9 g). Analysis was performed after drying the product for 10 hr at 110° C. under vacuum.

The average number molecular weight ($M_n$), the number average degree of polymerization, and the molecular weight distribution ($M_w/M_n$) of the prepared polymer were 580,000; 1124, and 1.41, respectively.

The structure of the prepared polymer was identical that found in Preparation Example 4.

Preparation Example 6

A 100 ml 1-neck round-bottomed flask and a 500 mL 3-neck round-bottomed flask connected to a dropping funnel and equipped with a magnetic stirrer were flame-dried under a dry nitrogen flow. After dissolving 5 g of 1,1,1-dichlorophenyl-3,3,3-dimethoxyphenyldisiloxane[PhCl$_2$Si—O—Si—Ph(OMe)$_2$], and 5 g of 1,1,1-dichlorophenyl-3,3,3-dimethoxymethyldisiloxane[PhCl$_2$Si—O—Si—Me(OMe)$_2$] in 80 mL of toluene in a separate 100 mL flask, the reaction mixture was stirred until the temperature reached 3° C. and then transferred to a dropping funnel. After placing 310 mL of distilled water and ice in the 500 mL 3-neck round bottom flask, the hydrolysis was performed by dropping the mixture solution slowly (1 drop per 1 sec) while stirring vigorously. After stirring another 20–30 min, after the dropping was finished, the hydrolysis was completed. The reaction solution was separated as a water layer and a toluene layer in a separation funnel. 70 wt. % of cooled sodium bicarbonate solution was dropped through a dropping funnel in order to neutralize the hydrochloric acid resident in the water layer to pH 7. After precipitating the hydrolysate in the water layer by the thawing method, and filtering the filtrate, 9.3 g of the hydrolysate mixtures (yield: 93 wt %) were obtained.

After dissolving 9.3 g of the hydrolysate in 10 mL of toluene in a 50 mL round bottom flask equipped with the Dean-Stark tube, the ladder polymerization was performed for 16 hr at 120° C. in the presence of 0.94 mg (0.01 wt %) of KOH catalyst. After dropping the reaction solution in excess methanol, stirring for about 30 min and filtering the precipitate, the product was obtained as white powder (yield: 98.9%, 9.2 g). Analysis was performed after drying the product for 10 hr at 110° C. under vacuum.

The average number molecular weight ($M_n$), the number average degree of polymerization, and the molecular weight distribution ($M_w/M_n$) of the prepared polymer were 105,000; 210; and 1.58, respectively.

Figure 8:
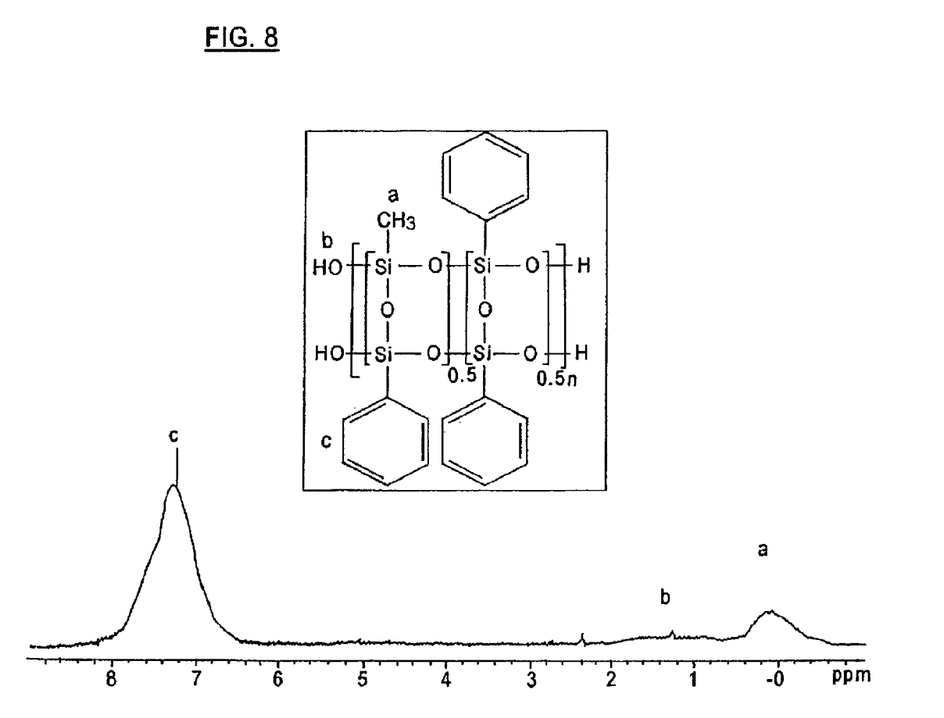
FIG. 8 is an $^1H$ NMR spectrum of poly(phenylsilsesquioxane-co-methylsilsesquioxane)

The structure of the prepared polymer was analyzed with $^1$H NMR and IR. $^1$H NMR analysis showed a Si—CH$_3$ chemical shift at 0.1 ppm, a Si—OH chemical shift at 1.3 ppm and a Si—Ph chemical shift at 7.3 ppm. In particular, the integral ratio of CH$_3$/Ph was 1:5 (1:3 mole ratio), which is close to the theoretical value (cf. FIG. 8).

Also, IR analysis showed the asymmetric stretching vibration of the siloxane bond (Si—O—Si) (theoretical values: 1040 & 1140 cm$^{-1}$), characteristic of the silicone ladder polymer, as a double peak at 1035.5 and 1137.9 cm$^{-1}$.

With these, the structure of the polymer of the present invention was identified as the formula (1).

Preparation Example 7

A 50 mL 3-neck round-bottled flask connected to a reflux condenser and equipped with a magnetic stiffer is flame-dried under dry nitrogen flow. After dissolving 10 g of 1,1,1-dihydroacetoxy-3,3,3-dihydroallyldisiloxane [CH$_3$COO(H)$_2$Si—O—Si—CH$_2$CH=CH$_2$(OH)$_2$] in 10 mL of toluene in the flask, the ladder polymerization is performed for 16 hr. at 120° C. without catalyst under a stream of dry nitrogen. During the reaction by-product (hydrogen) is removed using a stream of nitrogen. After dropping the reaction solution in excess methanol, stirring for about 30 min and filtering the precipitate, the product is obtained as white powder.

Preparation Example 8

A 50 mL 3-neck round-bottomed flask connected to a reflux condenser and equipped with a magnetic stirrer is flame-dried under dry nitrogen flow. After dissolving 5 g of 1,1,1-dipotassiumlatediethylamino-3,3,3-diacetoxycyclohexyldisiloxane [(CH$_3$CH$_2$)$_2$N(OK)$_2$ Si—O—Si—C$_6$H$_{11}$(CH$_3$COO)$_2$] in 10 mL of DMSO in the flask, the axial polymerization is performed for 24 hr at 120° C. After dropping the reaction solution in excess methanol/water mixture (5/5), stirring for about 30 min and filtering the precipitate, the product is obtained as white powder.

Preparation Example 9

A 50 mL 3-neck round-bottomed flask connected to a reflux condenser and equipped with a magnetic stirrer is flame-dried under dry nitrogen flow. After dissolving 10 g of 1,1,1-dihydroxypentafluorophenyl-3,3,3-diaminohexadecyldisiloxane [C$_6$F$_5$(OH)$_2$Si—O—Si—CH$_3$(CH$_2$)$_{14}$CH$_2$(NH$_2$)$_2$] in 10 mL of toluene in the flask, the ladder polymerization was performed for 16 hr at 120° C. without catalyst under a stream of dry nitrogen. During the reaction by-product (ammonia) was removed using a stream of nitrogen. After dropping the reaction solution in excess methanol, stirring for about 30 min and filtering the precipitate, the product is obtained as white powder.

Polyalkylaromaticsilsesquioxanes obtained from the preparation method of the present invention are useful as a heat-resistant material. Thus, these polymers can be used as a heat-resistant coating agent, a protective coating agent of optical fiber, a coating material for a resistor, a heat-resistant paint, an adhesive and a releasing agent for precise molding. Also, it can be used for a semiconductor protective layer, an interlayer dielectric for semiconductor integration (e.g. LSI), a resistant material, a new heat-resistant photoresist, and a functional photonics materials.

What is claimed is:
1. A substantially perfect ladder-structured polyalkylaromaticsilsesquioxane expressed by the following formula (1):

wherein $R_1$ and $R_2$ represent, independently, a hydrogen atom, an alkyl group having 1 to 30 carbon atoms, a substituted or non-substituted aromatic group having 1 to 30 carbon atoms, a substituted or non-substituted allyl group having 1 to 30 carbon atoms, a substituted or non-substituted cyclo-compound having 1 to 30 carbon atoms, a substituted or non-substituted acyl group having 1 to 30 carbon atoms, vinyl, or amine; and n is an integer of at least 5.

2. The substantially perfect ladder-structure polyalkylaromaticsilsesquioxane according to claim 1, wherein said n is an integer of about 5 to 5,000.

3. The substantially perfect ladder structure polyalkylaromaticsilsesquioxane according to claim 1, wherein said $R_1$ and $R_2$ represent independently a hydrogen atom, an alkyl group having 1 to 30 carbon atoms, and a substituted or non-substituted aromatic compound having 1 to 30 carbon atoms.

4. The substantially perfect ladder-structure polyalkylaromaticsilsesquioxane according to claim 3, wherein said alkyl group having 1 to 30 carbon atoms is selected from the group consisting of a methyl group, an ethyl group and a propyl group; and said substituted or non-substituted aromatic group having 1 to 30 carbon atoms is selected from the group consisting of a phenyl group and a halogenated phenyl group.

5. A method of preparing a substantially perfect ladder-structure polyalkylaromaticsilsesquioxane expressed by the following formula (1) which comprises polymerizing a 1,3-organodisiloxane expressed by the following formula (2):

wherein $R_1$ and $R_2$ represent independently a hydrogen atom, an alkyl group having 1 to 30 carbon atoms, a substituted or non-substituted aromatic group having 1 to 30 carbon atoms, a substituted or non-substituted alkyl group having 1 to 30 carbon atoms, a substituted or non-substituted cyclo-compound having 1 to 30 carbon atoms, a substituted or non-substituted acyl group having 1 to 30 carbon atoms, vinyl, or amine; n is an integer equal to or higher than 5; X represents a hydrogen atom, Cl, OH, $NH_2$ or carboxylate; and R represents a hydrogen atom, an alkyl group, an acyl group or an alkali metal, wherein the 1,3-organodisiloxane has a purity of at least about 90%.

6. The method of preparing a polyalkylaromaticsilsesquioxane polymer according to claim 5, which comprises a step of carrying out a condensation polymerization of same or different compounds selected from said 1,3-organodisiloxane expressed by formula (2).

7. The method of preparing a polyalkylaromaticsilsesquioxane according to claim 6, wherein said condensation polymerization is performed without a catalyst.

8. The method of preparing a polyalkylaromaticsilsesquioxane according to claim 6, wherein said condensation polymerization is performed in the presence of a catalyst.

9. The method of preparing a polyalkylaromaticsilsesquioxane according to claim 8, wherein said catalyst is at least one selected group consisting of an alkali metal hydroxide, an amine, a quaternary ammonium salt and a fluoride compound.

10. The method of preparing a polyalkylaromaticsilsesquioxane according to claim 9, wherein said alkali metal hydroxide is selected from the group consisting of NaOH, KOH and CsOH; and said amine is selected from the group consisting of triethylamine, diethylene triamine, m-butylamine, p-dimethylamine ethanol and triethanolamine.

11. The method of preparing a polyalkylaromaticsilsesquioxane according to claim 8, wherein said catalyst is present in a proportion of about 0.01 to 20 wt. % with reference to the weight of said 1,3-organodisiloxane.

12. The method of preparing a polyalkylaromaticsilsesquioxane according to claim 8, wherein said condensation polymerization is carried out for about 6–50 hours.

13. The method of preparing a polyalkylaromaticsilsesquioxane according to claim 6, wherein said condensation polymerization is carried out at a temperature of about 100–150° C.

14. A method of preparing a polyalkylaromaticsilsesquioxane expressed by the following formula (1):

wherein $R_1$ and $R_2$ represent independently a hydrogen atom, an alkyl group having 1 to 30 carbon atoms, a substituted or non-substituted aromatic compound having 1 to 30 carbon atoms, a substituted or non-substituted allyl group having 1 to 30 carbon atoms, a substituted or non-substituted cyclo-compound having 1 to 30 carbon atoms, a substituted or non-substituted acyl group having 1 to 30 carbon atoms, vinyl, or amine; is an integer equal to or higher than 5, which comprises steps of:
(a) carrying out a condensation polymerization of a solution of at least one compound according to the following formula (2) to produce a polyalkylaromaticsilsesquioxane expressed by formula (1):

wherein $R_1$ and $R_2$ represent independently a hydrogen atom, an alkyl group having 1 to 30 carbon atoms, a substituted or non-substituted aromatic compound having 1 to 30 carbon atoms, a substituted or non-substituted allyl group having 1 to 30 carbon atoms, a substituted or non-substituted cyclo-compound having 1 to 30 carbon atoms, a substituted or non-substituted acyl group having 1 to 30 carbon atoms, vinyl, or amine; and n is an integer equal to or higher than 5; X represents a hydrogen atom, Cl, OH, NH$_2$ or carboxylate; and R represents a hydrogen atom, an alkyl group, an acyl group or an alkali metal; and (b) carrying out a further polymerization of said polyalkylaromaticsilsesquioxane obtained in the step (a) in a solid state.

15. The method of preparing a polyalkylaromaticsilsesquioxane according to claim 14, wherein said polymerization of said step (b) is carried out at a temperature of about 150 to 350° C.

16. A method of increasing the degree of polymerization of a polyalkylaromaticsilsesquioxane expressed by the following formula (1) comprising a step of further condensation polymerizating a polyalkylaromaticsilsesquioxane expressed by the following formula (1) in a solid state:

(1)

wherein R$_1$ and R$_2$ represent independently a hydrogen atom, an alkyl group having 1 to 30 carbon atoms, a substituted or non-substituted aromatic compound having 1 to 30 carbon atoms, a substituted or non-substituted allyl group having 1 to 30 carbon atoms, a substituted or non-substituted cyclo-compound having 1 to 30 carbon atoms, a substituted or non-substituted acyl group having 1 to 30 carbon atoms, vinyl, or amine; and n is an integer equal to or higher than 5.

17. The method of increasing the degree of polymerization of said polyalkylaromaticsilsesquioxane according to claim 16, wherein said condensation polymerization is carried out at a temperature ranging from 150 to 350° C.

18. The substantially perfect ladder-structured polyalkylaromaticsilsesquioxane according to claim 1, which exhibits no non-ladder structure by $^{29}$Si NMR.

19. The substantially perfect ladder-structured polyalkylaromaticsilsesquioxane according to claim 1, wherein said substituted or non-substituted acyl group having 1 to 30 carbon atoms is acetyl.

20. The method according to claim 5, wherein said substituted or non-substituted acyl group having 1 to 30 carbon atoms is acetyl.

21. The method according to claim 14, wherein said substituted or non-substituted acyl group having 1 to 30 carbon atoms is acetyl.

22. The method according to claim 16, wherein said substituted or non-substituted acyl group having 1 to 30 carbon atoms is acetyl.

23. A substantially perfect ladder-structured polyalkylaromaticsilsesquioxane expressed by the following formula (1):

(1)

wherein R$_1$ and R$_2$ represent independently, a hydrogen atom, an alkyl group having 1 to 30 carbon atoms, a substituted or non-substituted cyclo-compound having 1 to 30 carbon atoms, a substituted or non-substituted acyl group having 1 to 30 carbon atoms, vinyl or amine, and n is an integer of equal to or higher than 5, wherein n is an integer of about 5 to 5,000.

24. The substantially perfect ladder-structured polyalkylaromaticsilsesquioxane of claim 23, wherein said substituted or non-substituted acyl group having 1 to 30 carbon atoms is acetyl.

* * * * *